Aug. 12, 1958     H. J. BURKE     2,847,050
WHEEL ASSEMBLIES
Filed March 15, 1955

INVENTOR.
Harold J. Burke
BY Fearman & Fearman
ATTORNEYS

2,847,050
WHEEL ASSEMBLIES

Harold J. Burke, Saginaw, Mich., assignor to Saginaw Products Corporation, Saginaw, Mich., a corporation of Michigan Application March 15, 1955, Serial No. 494,368

6 Claims. (Cl. 152—404)

This invention relates to wheel assemblies for materials handling trucks and the like, and more particularly to a wheel assembly on which a tubeless tire may be mounted.

To permit the easy assembly of tires thereon on a quantity production basis, industrial truck wheels have long comprised a pair of separable sections which are bolted together once the tires are mounted in position. With the advent of the tubeless tire which is now manufactured at a cost comparable to the combined cost of the conventional tube and tire, it has become desirable to employ tubeless tires on the wheels of materials handling trucks. However a problem which has defied solution is the problem of designing a thoroughly practical fluid-tight joint for preventing the escape of air out between the separable sections of the truck wheels. The use of the well known O-ring has been suggested, however it has been found that the O-ring is easily twisted when applied to a surface of slightly greatly diameter and, of course, such a seal could obviously not be air-tight. Various known gaskets were also found to be unsatisfactory for effecting a fluid-tight seal.

One of the prime objects of the instant invention is to provide a fluid-tight joint at the rim portions of the separable wheel sections of industrial trucks which includes a seal which can very readily be applied on a production scale basis without adding to the labor time required for assembling the wheels.

A further object of the invention is to design a seal of the type described which actually assists in the assembly of the wheels, in that it functions as a pilot, when applied to one of the wheel sections, for guiding the other wheel section into position.

Another object of the invention is to design a seal of the type described which is so shaped as to tend to wedge itself into sealing relation when air under pressure is supplied to the tubeless tire.

A still further object of the invention is to design a fluid seal of simple and practical construction which may be very economically molded.

With the above and other objects in view, the present invention consists in the combination and arrangement of parts hereinafter more fully described, illustrated in the accompanying drawing, and more particularly pointed out in the appended claims, it being understood that changes may be made in the various elements which comprise the invention without departing from the spirit thereof or the scope of the appended claims.

Figure 2:
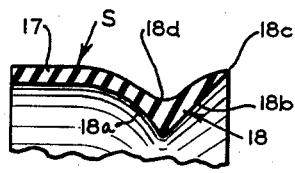
Fig. 2 is an enlarged cross sectional view showing the seal only.
Figure 1:
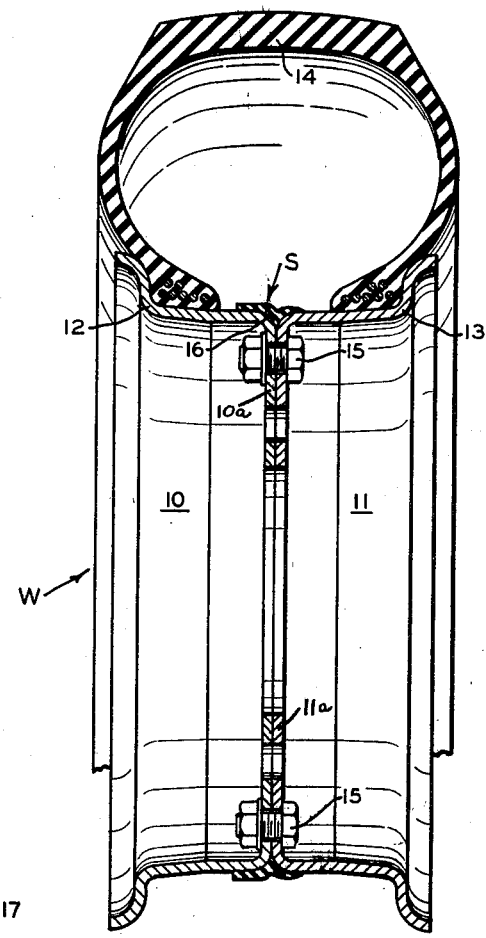
Fig. 1 is a fragmentary, transverse, sectional view through a wheel showing the seal in position at the juncture of the separate rim sections.
Figure 3:
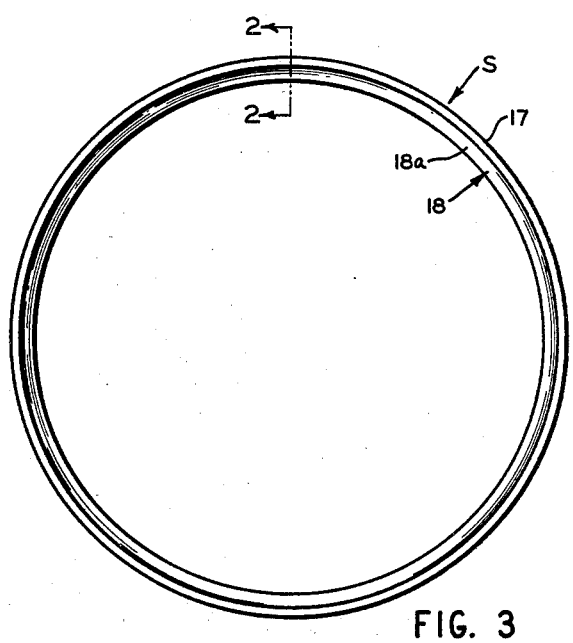
Fig. 3 is a side view of the seal.

Referring now more particularly to the accompanying drawing wherein I have shown a preferred embodiment of the invention, a letter W generally indicates a wheel assembly which comprises a pair of separable annular wheel sections 10 and 11, each section having mating disk or web portions 10a and 11a and laterally outturned bead seating and retaining rim portions 12 and 13 respectively forming a rim to receive a tubeless tire 14. The tire here depicted is of conventional design and it is to be understood that tubeless tires of varying design could be mounted on the rim pictured, or the retaining walls of the rim sections could be differently shaped if desired. The sections 12 and 13 which are adapted to be bolted together as at 15 are curved outwardly at the juncture of the flanges 12 and 13 to form a triangularly shaped groove 16 therebetween whose marginal walls are of generally uniformly curvilinear configuration but have surface variances, of course.

An annular rubber seal S, which is of slightly less diameter than the rim sections 12 and 13 includes an elongated lip 17 which is adapted to be mounted on the rim section 12. Provided integrally on the one edge of the lip 17 is a depending wedge shaped bead 18 whose one side wall 18a is shaped to conform to the configuration of the one marginal wall of the groove 16. The other side wall 18b of the bead is flat and does not conform to the opposite side wall of the groove 16 and the reason for this will later become apparent. The outer portion of the bead 18 is recessed so that the bead is actually V-shaped in section and the leg of the bead which tapers to a fine edge at 18c may be said to be hinged to the other portion of the bead at 18d. Thus, if the groove 16 is not entirely uniform or varies slightly in size with different wheels the seal will readily adjust itself to the groove when air under pressure is admitted to the tire 14 through a conventional valve or the like.

In the assembly of the wheel the tire 14 is first mounted in position on the rim section 12 and the lip 17 of the seal S is then stretched slightly and slipped onto the rim 12. Since the side wall 18a of the bead 18 conforms to the marginal side wall of the groove 16 the seal is very readily mounted in exactly the desired position and then functions as a pilot when the other wheel section 13 is inserted into the portion of the tire which overhangs the wheel section 12. The sections 10 and 11 are, of course, bolted together before air is forced into the tire and the bead 18 does not depend sufficiently so that it will be pinched therebetween. When air is admitted to the tire however, the bead tends to be wedged into the groove 16 to form a fluid-tight joint which will not leak under any circumstances. Because the one side wall 18b of the bead is flat, the depending edge of the bead will tend to be displaced in a manner to enhance the wedging action. In order to hold the seal in position during assembly of the wheel section 13 without danger of its being displaced the lip 17 should be of approximately the same width as the bead 18 or wider.

Obviously with a seal as described the wheels may be assembled very rapidly by relatively unskilled workmen. The seals will never tend to be twisted in application and the lips 17 will hold them in place during the assembly operation. In some cases the seals might be applied to the first wheel section prior to the time the tire is mounted thereon, or in other cases the seals might be applied after assembly when very small wheels are being assembled and the side of the tire casing can be pushed in after the sections are bolted together.

While I have mentioned that the seal is formed of rubber I wish it understood that I use this term to mean any resilient or elastic material which might be used. In all cases the foregoing descriptive matter and drawing is to be interpreted as merely illustrative of one form of the invention rather than as limiting since I contemplate that various changes may be made in the various elements within the scope of the appended claims.

I claim:
1. In a wheel assembly, a pair of oppositely disposed wheel sections having mating radial disk portions with oppositely and outwardly extending flanges thereon shaped to form a tire retaining rim, said flanges at the juncture of the disk portion and flange of each section being shaped to provide a peripheral groove between said sections having converging side walls; means securing the disk portions of said wheel sections together in facial engagement; a tubeless, pneumatic tire having an interior air chamber closed in part by said rim held on said rim on said flanges; and a member, comprising a flexible, deformable, wedge shaped section having converging side walls, seated in said groove outward of the juncture of the facially engaged sections of the said disk portions, with the converging side walls of the member in engagement with the converging side walls of the wheel sections; said tire being inflatable with a fluid medium under pressure which presses the side walls of the said member into tight, sealed engagement with the converging walls of the sections and wedges the deformable, wedge shaped section into tight relation with the inner portion of the groove at the juncture of the facially engaged sections of the said disk portions.

2. The combination defined in claim 1 in which the converging side walls of said peripheral groove are curvilinear and at least one of the converging side walls of said wedge section is flat, and the pressure of the fluid inside the tire chamber deforms said flat wall to the shape of said curved wall to provide a tight seal.

3. The combination defined in claim 1 in which said wedge section is V-shaped in cross section to form a pair of leg portions hinged at their juncture which are pressed by the pressure of the fluid in the tire into tight sealed engagement with the converging walls of the wheel sections.

4. The combination defined in claim 1 in which a laterally extending lip is provided on said section and the lip seats on the rim portion of one of the wheel sections.

5. In a wheel assembly; a pair of mating wheel sections having radial disk portions with oppositely outturned flanges thereon shaped to provide a tire retaining rim; said flanges at the juncture of the disk portion and flange of each section being shaped to provide a peripheral groove between said sections having converging side walls; means securing the disk portions of said wheel sections together in facial engagement; a tubeless, pneumatic tire having an interior air chamber closed in part by said rim held on said rim on said flanges; and a member comprising a resilient, deformable, wedge shaped section of slightly less diameter than said rim at the juncture of the flanges and disk portions of the wheel sections having converging side walls, seated in said groove outward of the juncture of the facially engaged sections of the said disk portions with the converging side walls of the member in engagement with the converging side walls of the wheel sections; said tire being inflatable with a fluid medium under pressure which presses the side walls of the said member into tight sealed engagement with the converging walls of the sections and wedges the resilient, deformable wedge shaped section of the member adjacent the juncture of the mating disk sections into tight relation with the juncture.

6. In a wheel assembly, a pair of oppositely disposed, mating, wheel sections heaving radial disk portions with oppositely and outwardly laterally extending flanges thereon shaped to form a tire retaining rim, said rim at the juncture of the disk portion and flange of each section having a peripheral groove; means securing the disk portions of said wheel sections together; a tubeless tire having an interior air chamber closed in part by said rim held on said rim on said flanges and an elastic seal member having a radially extending section for sealing said peripheral groove seated in said groove; and a laterally extending lip radially outward of said groove mounting said seal in position on one of said laterally extending flanges, said lip being of less diameter than said latter flange to retain the seal in place when the lip is stretched over the said latter flange.

References Cited in the file of this patent
UNITED STATES PATENTS

| | | |
|---|---|---|
| 1,023,454 | Black | Apr. 6, 1912 |
| 1,491,537 | Killen | Apr. 22, 1924 |
| 1,991,594 | Case | Feb. 19, 1935 |
| 2,517,521 | Zere | Aug. 1, 1950 |